United States Patent [19]

Isnardi

[11] Patent Number: 4,949,166
[45] Date of Patent: Aug. 14, 1990

[54] APPARATUS FOR COMBINING AND SEPARATING CONSTITUENT COMPONENTS OF A VIDEO SIGNAL

[75] Inventor: Michael A. Isnardi, Plainsboro, N.J.

[73] Assignee: General Electric Company, Princeton, N.J.

[21] Appl. No.: 253,273

[22] Filed: Oct. 3, 1988

[51] Int. Cl.$^5$ ............................................. H04N 11/14
[52] U.S. Cl. ........................................ 358/12; 358/16; 358/31
[58] Field of Search ....................... 358/12, 14, 15, 16, 358/23, 31

[56] References Cited

U.S. PATENT DOCUMENTS

| | | | |
|---|---|---|---|
| 4,517,597 | 5/1985 | Glenn | 358/12 |
| 4,521,803 | 6/1985 | Gittinger | 358/12 |
| 4,701,783 | 10/1987 | Glenn | 358/12 |

OTHER PUBLICATIONS

Strolle, "Cooperative Processing for Improved NTSC Chrominance/Luminance Separation", SMPTE Journal, Aug. 1986, pp. 782-789.

Isnardi, "Encoding for Compatibility and Recoverability in the ACTV System", IEEE Transactions on Broadcasting, vol. BC-33, No. 4, Dec. 1987, pp. 116-123.

Tsinberg, et al., "A System for Artifact Free NTSC Encoding and Decoding", IEEE Transactions on Consumer Electronics, vol. CE-32, No. 3, Aug. 1986, pp. 228-236.

Nakajima et al., "Improvement of Picture Quality for NTSC and PAL Systems by Digital Signal Procesing", IEEE Transaction on Consumer Electronics, vol. CE-31, No. 4, Nov. 1985, pp. 642-654.

Teichner, "Quality Improvement by Adaptive Inter-Intraframe Processing in PAL TV Receviers", IEEE Transactions on Consumer Electronics, vol. CE-31, No. 3, Aug. 1985, pp. 226-238.

Faroudja et al., "Improving NTSC to Achieve Near-RGB Performance", SMPTE Jornal, Aug. 1987, pp. 750-761.

Primary Examiner—Tommy P. Chin
Attorney, Agent, or Firm—Joseph S. Tripoli; Eric P. Herrmann; Ronald H. Kurdyla

[57] ABSTRACT

The luminance component of a video signal is processed to produce a luminance component with groups of mutually exclusive spatially correlated image pixels of identical value within each group. In one embodiment each group comprises vertically averaged pixels 1H apart within a field. In another embodiment each group comprises vertically averaged pixels apart within a frame. The chrominance component is similarly processed. The processed luminance and chrominance components are combined using an invertible algorithm involving additive and subtractive signal combination. At a decoder, the inverse of the combining algorithm is used to separate the combined signal into its constitutent luminance and chrominance component parts, without luminance-chrominance crosstalk.

30 Claims, 7 Drawing Sheets

APPARATUS FOR COMBINING AND SEPARATING CONSTITUENT COMPONENTS OF A VIDEO SIGNAL

BACKGROUND OF THE INVENTION

This invention concerns apparatus for encoding video signal components to be combined, such as the luminance and chrominance components of an NTSC-type television signal, to facilitate the separation of such components without crosstalk artifacts.

It is well-known that the frequency interleaving of the baseband luminance and chrominance components of an NTSC-type television signal does not always permit the two components to be separated without crosstalk artifacts such as cross-color and cross-luminance artifacts. The cross-color artifact results from chrominance contamination of luminance information, and can be described as a scintillating rainbow pattern in parts of an image where diagonal high frequency luminance information is present, such as on a striped shirt. The cross-luminance artifact is sometimes referred to as the "hanging dot" artifact, and is visible in a system using a comb filter type luminance/chrominance separator. Cross-luminance results from luminance contamination of chrominance information particularly at vertical image transition regions.

Cross-color and cross-luminance artifacts are introduced at two places in the system. First, imperfect or incorrect chrominance/luminance separation at a television receiver causes luminance to be interpreted as chrominance and vice-versa. The second way in which cross-color and cross-luminance artifacts are introduced is in the encoding process itself, which frequency interleaves the luminance and chrominance components.

Various methods have been proposed to improve the separation of luminance and chrominance components at the receiver by reducing luminance/chrominance crosstalk artifacts. Some of these methods involve source and receiver processing schemes using line, frame and field comb filters, such as described by C. H. Strolle in "Cooperative Processing of Improved NTSC Chrominance/Luminance Separation", *SMPTE Journal*, August 1986. Another system for prefiltering luminance and chrominance information via multi-dimensional comb filters before being combined is disclosed by Faroudja et al. in "Improving NTSC to Achieve Near-RGB Performance", *SMPTE Journal*, August 1987.

The proposed methods which seek to eliminate luminance/chrominance crosstalk artifacts suffer from one or more practical drawbacks related to switching artifacts in motion adaptive processing systems, or to filtering complexity in terms of memory requirements and the number of filter taps, for example. The luminance/Chrominance separation system disclosed herein in accordance with the present invention uses a cooperative processing technique with matched encoding and decoding processes. The disclosed system exhibits perfect luminance/chrominance separation in the vertical and vertical-temporal directions with minimal image degradation, and avoids many of the drawbacks of the known systems. In addition, the disclosed system is compatible with the existing NTSC system.

SUMMARY OF THE INVENTION

In accordance with a disclosed preferred embodiment of the present invention, at a video signal encoder a baseband luminance component is processed to produce a luminance component with groups of mutually exclusive luminance image pixels of identical value within each group and separated by an odd number of image scanning lines within an image frame. Similarly, the chrominance component is processed to produce a baseband chrominance component with groups of mutually exclusive chrominance image pixels of identical value within each group and separated by an odd number of image scanning lines within a frame. The processed luminance and chrominance components are combined by means of an invertible algorithm. At a decoder, the inverse of the combining algorithm is used to separate the combined signal into its constituent processed luminance component and processed chrominance component parts, without luminance/chrominance crosstalk.

In an illustrated embodiment of the invention, each group comprises a pair of vertically averaged spatially correlated pixels one horizontal scanning line (1H) apart, with the luminance information being processed only for frequencies above the vertical detail band. The invertible combining algorithm involves additive and subtractive combination of the luminance component with the chrominance component modulating a chrominance subcarrier. In another illustrated embodiment of the invention, each group comprises a pair of averaged spatially correlated pixels 263H apart within an image frame.

Figure 1:
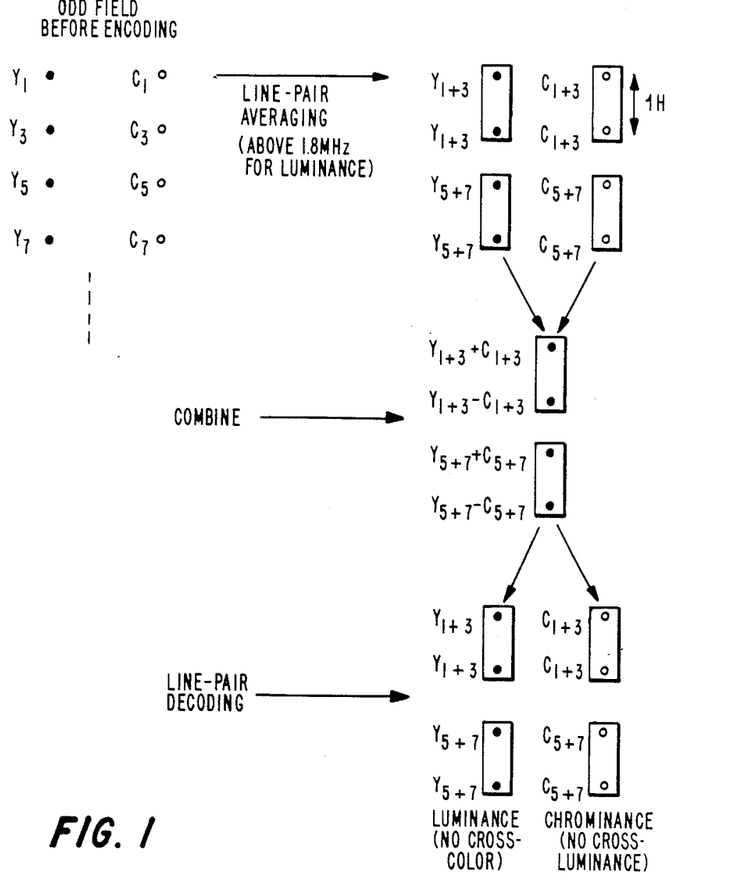
FIG. 1 illustrates a luminance/chrominance encoding and decoding technique according to the present invention, using a 1H line interval encoding process.

FIG. 1 illustrates one process by which luminance and chrominance components of a standard NTSC television signal are encoded at a transmitter and decoded at a receiver. In FIG. 1, an odd image field before encoding is shown as having interlaced baseband luminance (Y) information associated with odd horizontal image scanning lines, designated as Y1, Y3, Y5, Y7 etc., and interlaced baseband chrominance (C) information associated with odd horizontal image scanning lines, designated as C1, C3, C5, C7 etc. Within each odd field (and even fields not shown) of a given frame, mutually exclusive non-overlapping groups of spatially correlated picture element (pixel) pairs 1H apart are processed by averaging line-pairs vertically and replacing the original pixel values with the average values within each pixel group. This process is performed separately for luminance and chrominance information. The averaging process is performed for all chrominance horizontal frequencies, but is performed only for luminance horizontal frequencies above about 1.8 MHz to preserve vertical detail information below about 1.8 MHz. The averaged chrominance information modulates a 3.58 MHz chrominance subcarrier having an opposite phase from line-to-line within a field before being combined with the averaged luminance information in a standard manner to form a composite baseband color video signal. The modulated chrominance signal is then combined with the processed luminance information. The line-to-line opposite phase exhibited by the chrominance information as a result of the subcarrier modulation process produces additive and subtractive combinations of luminance and chrominance information within each group of combined luminance/chrominance information. The additive and subtractive luminance/chrominance combinations associated with the combination process (e.g., $Y_{1+3} \pm C_{1+3}$) represent an invertible algorithm to facilitate the separation of the luminance and chrominance information at the receiver. More specifically, the phase of the chrominance subcarrier changes so that the phase of the modulated chrominance signal is the same from line-to-line for samples 262H apart within an image frame, but is opposite for odd numbered line samples 1H apart within a field and 263H apart within a frame. This line-to-line phase change provides the subtractive aspect of the additive-subtractive invertible algorithm.

Decoding at a receiver employs a line-pair decoding process within a field. A received encoded composite signal is separated into low and high horizontal frequency bands. Above about 2 MHz, the mutually exclusive non-overlapping groups containing line-pairs 1H apart are summed to produce high frequency luminance information, and are differenced to yield the modulated chrominance information. The high frequency luminance information is added to the low frequency luminance information to reconstitute the luminance signal, and the modulated chrominance information is demodulated in the standard manner. The 1H line-pair processing system of FIG. 1 exhibits perfect luminance-chrominance separation in the vertical dimension. The luminance signal produced after line-pair decoding ($Y_{1+3}$, $Y_{5+7}$ etc.) does not contain cross-color artifacts, and the chrominance component produced after line-pair decoding ($C_{1+3}$, $C_{5+7}$ etc.) lacks cross-luminance artifacts. The line-pair averaging used in the encoding process has a negligible effect on image resolution because of the high correlation of image information a line apart within a field, or a field apart within a frame.

Figure 2:
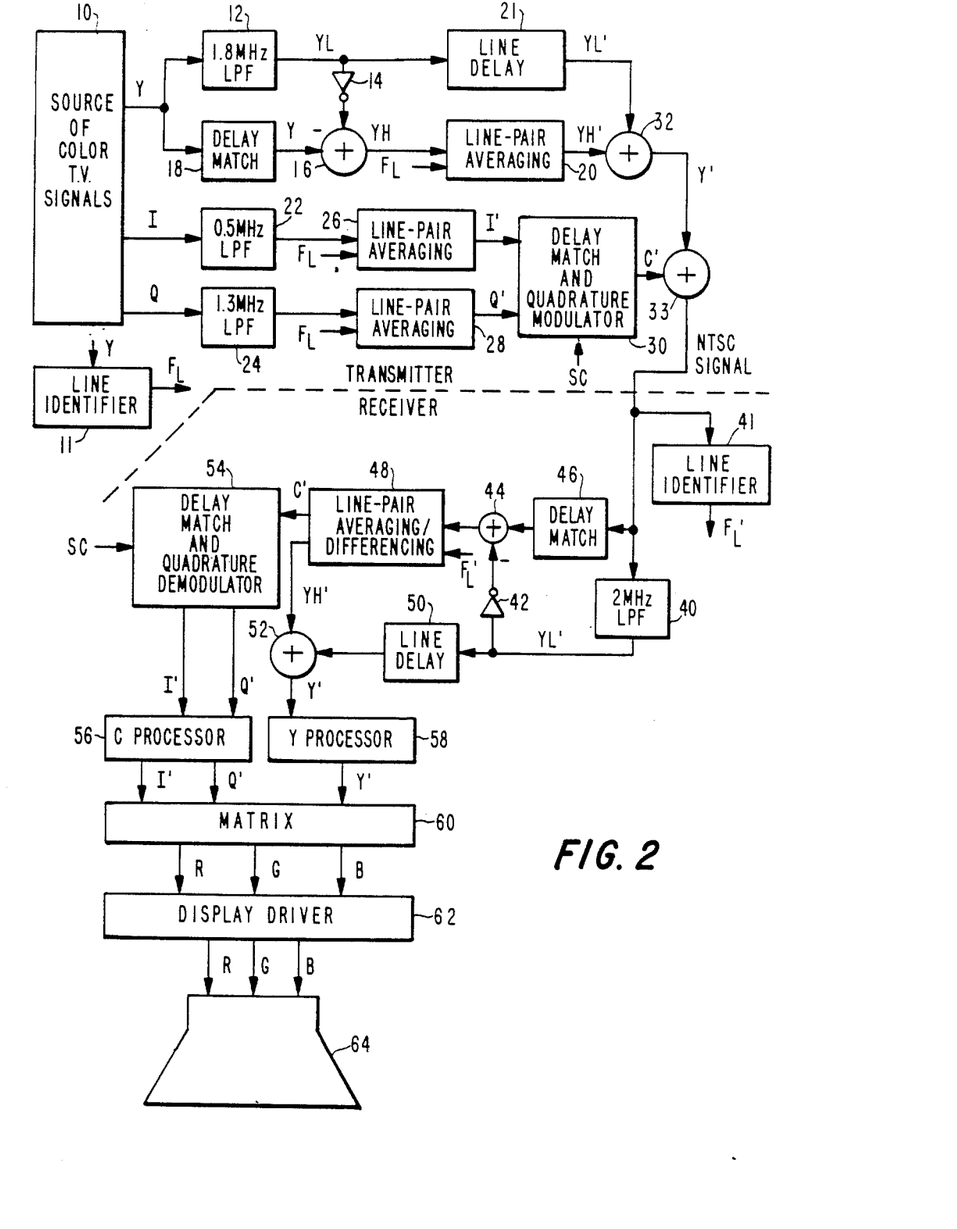
FIG. 2 is a block diagram of apparatus implementing the technique of FIG. 1.

The encoding/decoding process of FIG. 1 can be implemented as shown in FIG. 2, as follows. In a transmitter encoder, a source of color T.V. signals 10, e.g., including a color camera, provides a luminance component Y and chrominance color difference signal components I and Q in digital form. The luminance component is filtered by means of a 1.8 MHz horizontal lowpass filter 12 to produce a low frequency luminance signal YL. Signal YL, after inversion by an inverter 14, is combined in an adder 16 with the original luminance signal (Y) to produce a high frequency luminance signal YH. A delay matching unit 18 equalizes the transit times of the signals combined in adder 16 by compensating for the delay of filter 12. Signal YH, containing luminance frequencies above approximately 1.8 MHz, is subjected to a 1H line pair averaging process within a field, as discussed in connection with FIG. 1, by means of a processor 20. A signal YH' from processor 20 is combined in an adder 32 with low frequency luminance signal YL' from the output of a 1H line delay network 21.

Figure 9:
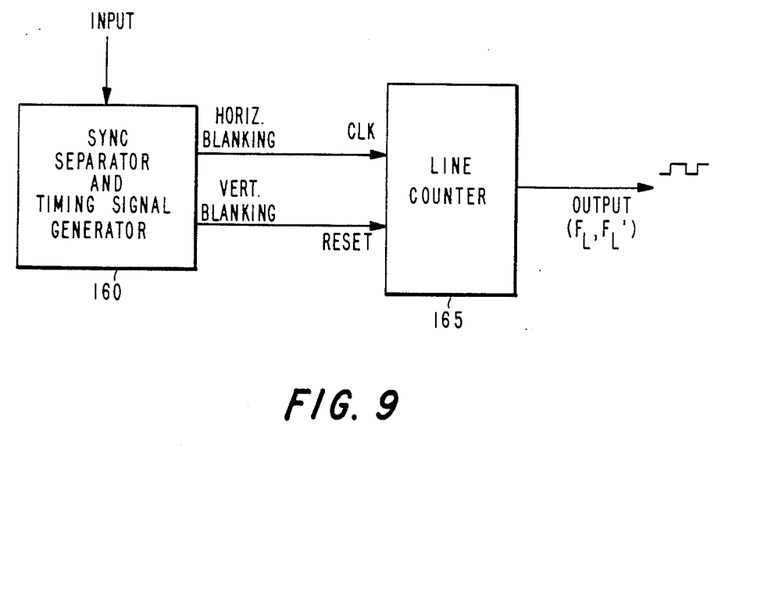
FIG. 9 shows a portion of the apparatus of FIG. 2 in greater detail.

The I and Q color difference signal components from source 10 are filtered by a 0.5 MHz lowpass filter 22 and a 1.3 MHz lowpass filter 24, respectively, before being separately subjected to a 1H line-pair averaging process in units 26 and 28. Line-pair averaged chrominance signals I' and Q' from units 26 and 28 are applied to a standard NTSC modulator 30 for quadrature modulating a 3.58 MHz chrominance subcarrier SC. Included in unit 30 is a delay matching network for equalizing the transit times of the color difference signals from units 26 and 28 before modulating the chrominance subcarrier. A modulated chrominance signal C' from modulator 30 exhibits line-to-line phase reversal and is combined in an adder 33 with signal Y' from adder 32 to produce an output NTSC signal which is conveyed via suitable transmission apparatus, e.g., including RF modulator networks, to a television signal receiver. A line identifier signal $F_L$ is provided by a line identifier network 11 to switching control inputs of units 20, 26 and 28. Network 11 responds to luminance component Y, particularly to the synchronizing information of luminance component Y. Signal $F_L$, together with a similar signal $F_L'$ provided to receiver network 48 by a receiver line identifier network 41 in response to the received NTSC signal, assures that the line encoding and decoding processes are synchronized to occur with respect to the same line pairs. Apparatus suitable for use as networks 11 and 41 is shown in FIG. 9.

At the television signal receiver, after RF demodulation and associated conventional input processing to produce a baseband signal (not shown), the NTSC signal is filtered by means of a 2 MHz lowpass filter 40 to produce low frequency luminance signal YL'. The 2 MHz cut-off frequency of filter 40 together with the 1.8 MHz cut-off frequency of encoder filter 12 produces a 200 KHz guardband to reduce horizontal crosstalk. Signal YL', after inversion by an inverter 42, is combined with the received full bandwidth NTSC signal in a combiner 44 to produce a high frequency video signal above 2 MHz. A delay network 46 compensates for the delay exhibited by filter 40 and equalizes the transit times of the signals combined by unit 44. The high frequency signal from combiner 44 is processed by an averaging and differencing unit 48 which processes line-pairs 1H apart to separate the input signal into high frequency luminance and chrominance components YH' and C'. High frequency luminance signal YH' is combined in an adder 52 with low frequency luminance signal YL' after signal YL' is subjected to a 1H line delay via a unit 50, for producing a full bandwidth luminance signal Y'.

Modulated chrominance component C' from unit 48 is conveyed to a unit 54 which provides delay matching and quadrature demodulation functions to produce color difference signals I' and Q'. Signals I' and Q' are processed by a chrominance processor 56 including gain control and phase shifting circuits for example, and luminance signal Y' is processed by a luminance processor 58 illustratively including gain control and level shifting circuits, before being applied to a matrix 60 for combining the luminance and chrominance signals to produce red, green and blue image representative signals R, G and B. A display driver stage 62 amplifies these signals to a level suitable for driving an image display kinescope 64.

Figures 3, 4:
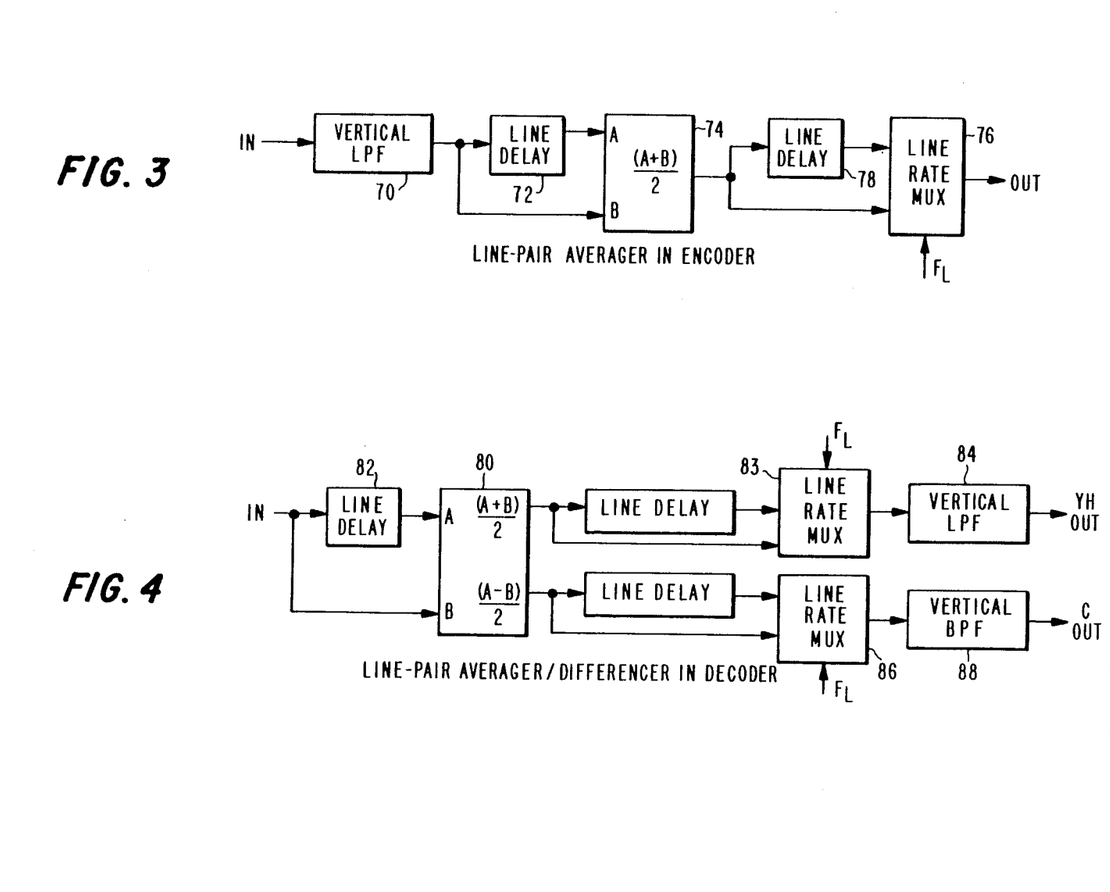
FIGS. 3 and 4 show aspects of the apparatus of FIG. 2 in greater detail.

FIG. 3 shows a line-pair averager circuit suitable for use in units 20, 26 and 28 of the encoder arrangement in FIG. 2. Input signals are filtered by a vertical lowpass filter 70 which is included to reduce vertical aliasing artifacts that may occur with certain diagonal scene material. Filter 70 is optional. The filtered input signal is coupled via a 1H line delay unit 72 to an input A of an averaging network 74, and is coupled directly to an input B of averaging network 74. A line averaged signal from network 74 is coupled directly to one input of a line rate multiplexer (MUX) 76, and to another input of MUX 76 via a 1H line delay 78. Signal $F_L$ from network 11 is applied to a switching control input of MUX 76.

FIG. 4 shows details of line-pair averager/differencer 48 in FIG. 2. A unit 80 receives a line delayed version of the input signal at an input A via a 1H line delay unit 82, and receives the input signal itself at an input B. At one output an averaged signal $(A+B)/2$ is produced, and a differenced signal $(A-B)/2$ is produced at another output. 1H line delayed and undelayed versions of the averaged signal from unit 80 are conveyed via a line rate MUX 83 and a vertical lowpass filter 84 to an output at which signal YH is produced. 1H line delayed and undelayed versions of the differenced signal from unit 80 are conveyed via a line rate MUX 86 and a vertical bandpass filter 88 to an output at which chrominance signal C is developed. Signal $F_L$ is applied to a switching control input of MUX 83 and MUX 86. Output filters 84 and 88 are optional and serve essentially the same purpose as filter 70 in FIG. 3.

Figure 5:
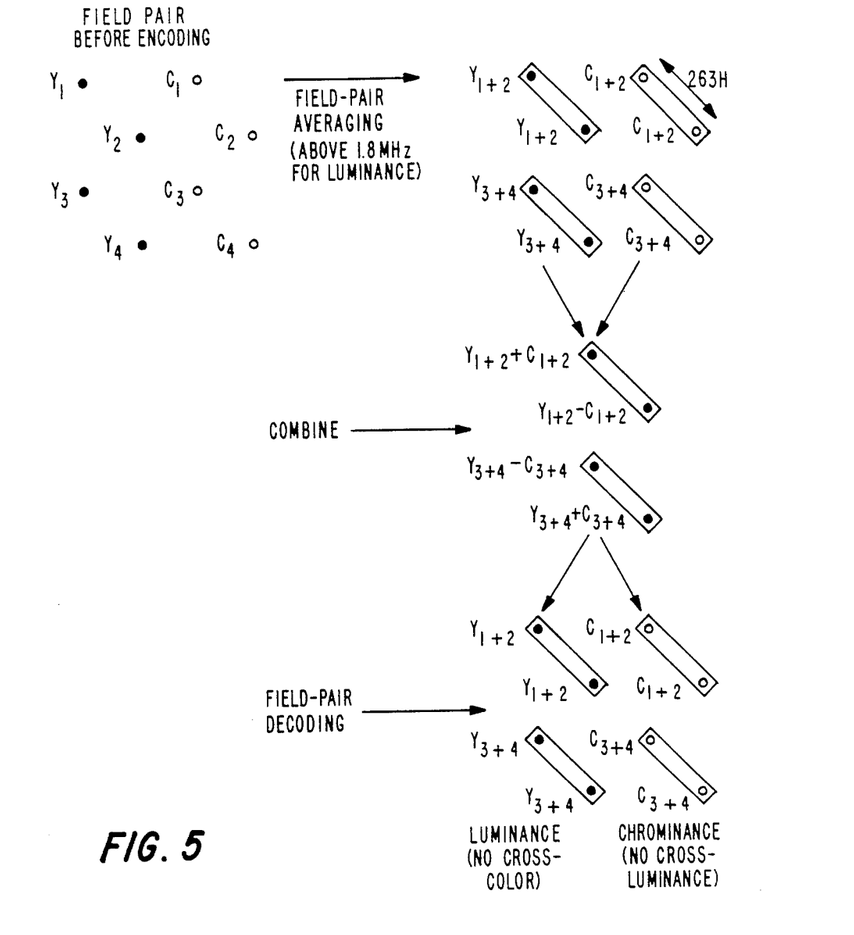
FIG. 5 illustrates a luminance/chrominance encoding and decoding technique according to the present invention, using a 263H field interval encoding technique.

FIG. 5 illustrates another method by which luminance and chrominance components of a standard NTSC television signal are encoded at a transmitter and decoded at a receiver without luminance/chrominance crosstalk. The method illustrated by FIG. 5 is similar to that of FIG. 1 except that in FIG. 5 263H field pair processing rather than 1H line-pair processing is employed.

In FIG. 5 each odd field includes interlaced baseband luminance information associated with odd horizontal image scanning lines Y1, Y3 etc., and associated interlaced baseband chrominance information C1, C3 etc.. Each even field includes interlaced baseband luminance information associated with even horizontal image scanning lines Y2, Y4 etc., and associated interlaced baseband chrominance information C2, C4 etc. Within each frame, line pairs 263H apart are processed such that mutually exclusive non-overlapping groups of pixels 263H apart are averaged vertically, with the average values replacing the original values within each group. This process is performed separately for luminance and chrominance information. The averaging process is performed for all chrominance horizontal frequencies, but is performed only for luminance horizontal frequencies above about 1.8 MHz to preserve luminance vertical detail information below about 1.8 MHz. The averaged chrominance information modulates a 3.58 MHz chrominance subcarrier having an opposite phase from line-to-line, before being combined with the averaged luminance information in a standard manner to form a composite baseband color video signal. The line-to-line phase inversion exhibited by the modulated chrominance signal as a result of the chrominance modulation process produces additive and subtractive combinations of luminance and chrominance information within each group of combined luminance/chrominance information. As in the case of the FIG. 1 system, the additive and subtractive luminance/chrominance combination represents an invertible algorithm to facilitate luminance/chrominance separation at the receiver.

Decoding at a receiver is essentially the same as discussed in connection with the arrangement of FIG. 1, except that the arrangement of FIG. 5 employs a 263H field pair decoding process within a frame. The field pair processing system of FIG. 5 exhibits perfect luminance-chrominance separation in the vertical-temporal dimension without cross-color or cross-luminance artifacts.

Figure 6:
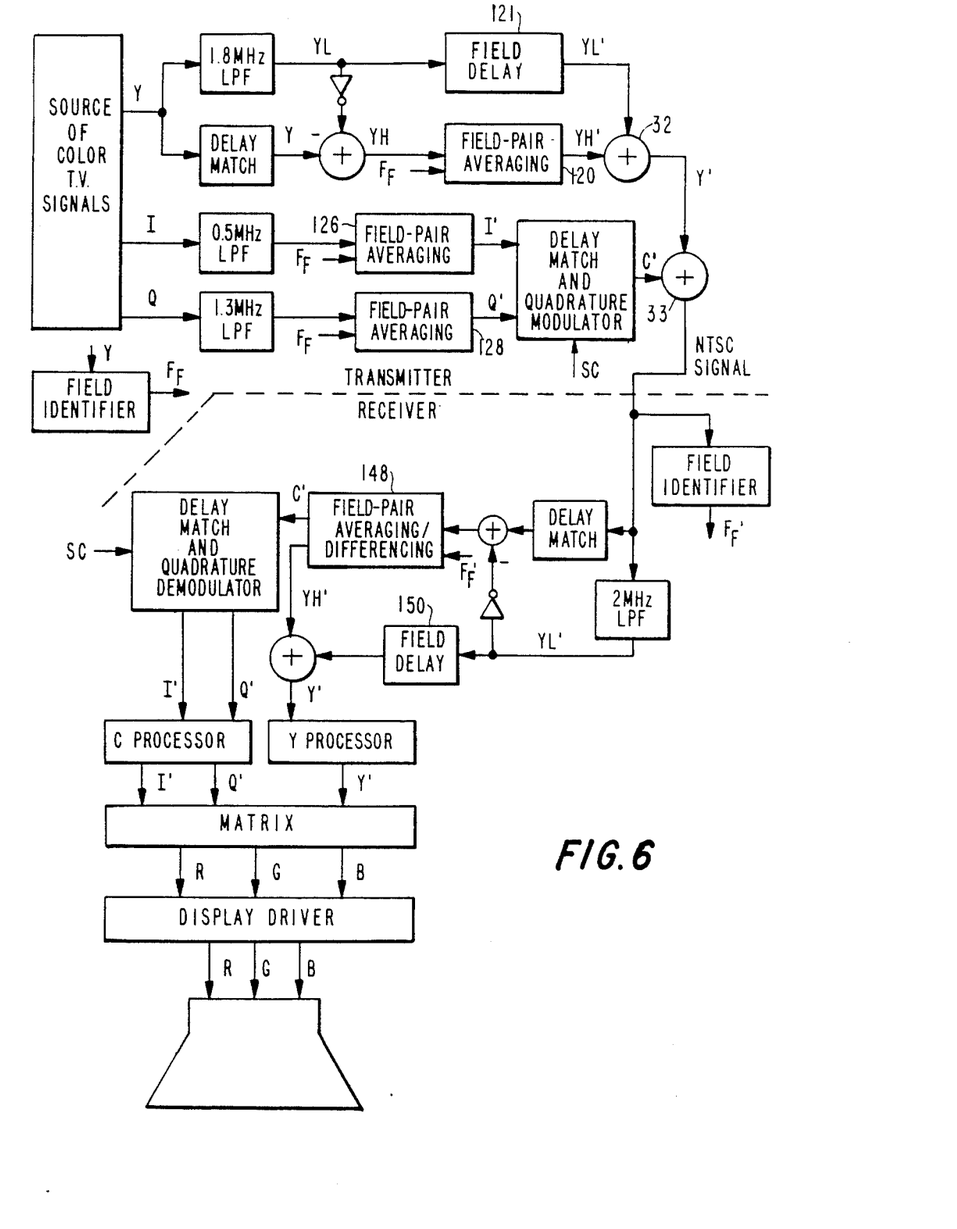
FIG. 6 is a block diagram of apparatus implementing the technique of FIG. 5.

The encoding/decoding process of FIG. 5 can be implemented as shown in FIG. 6. The arrangement of FIG. 6 is similar to that of FIG. 2 except that FIG. 6 uses 263H field processing networks 120, 121, 126, 128, 148 and 150 rather than 1H line processing networks, and field rather than line identifier networks for producing field identifier signals $F_F$ and $F'_F$.

Figure 7:
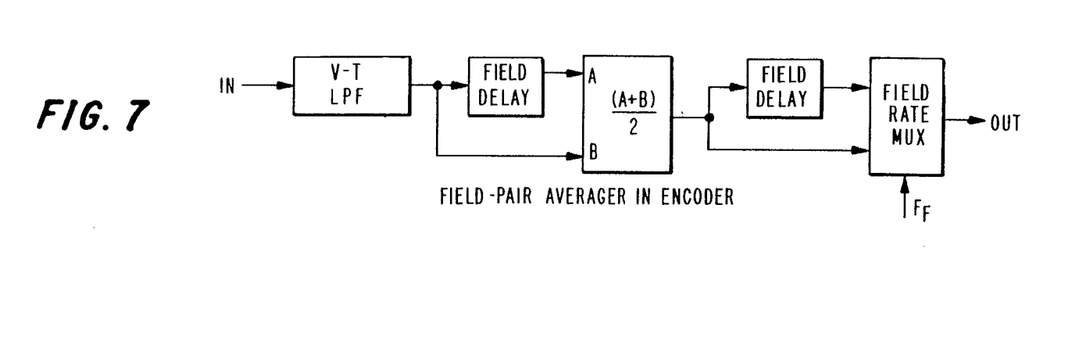
FIGS. 7 and 8 show aspects of the apparatus of FIG. 6 in greater detail.
Figure 8:
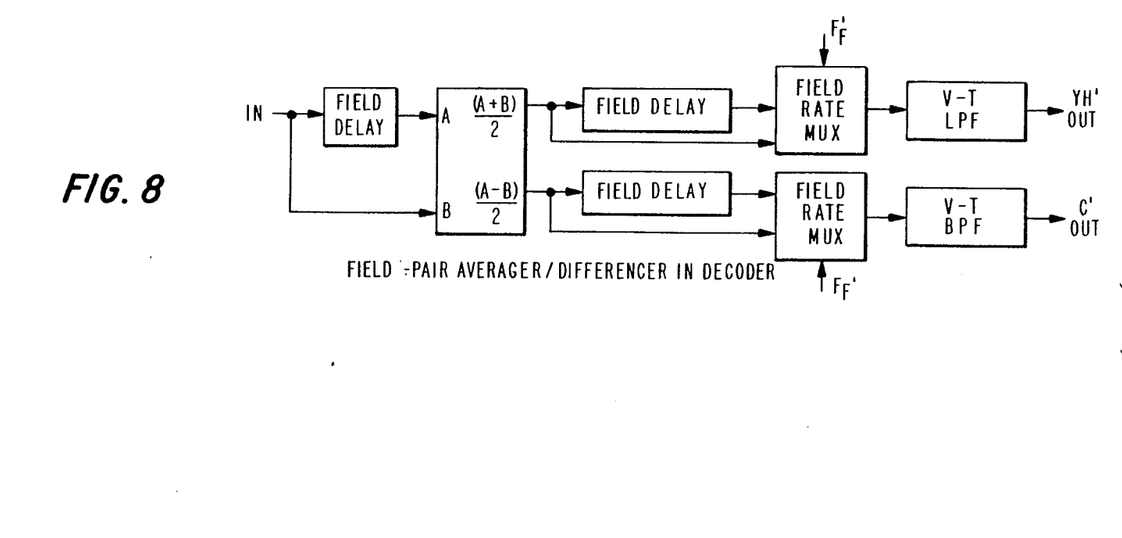

FIG. 7 shows a 263H field-pair averager network suitable for use in encoder field pair averaging networks 120, 126 and 128 of FIG. 6. FIG. 8 shows a field-pair averager/differencer suitable for use in decoder network 148 of FIG. 6. The apparatus of FIGS. 7 and 8 are similar to the apparatus of FIGS. 3 and 4 except that the apparatus of FIGS. 7 and 8 employ 263H field-pair processing units rather than 1H line-pair processing units.

FIG. 9 shows apparatus suitable for use as networks 11 and 41 of FIG. 2. An input signal, such as luminance component Y in the case of generator 11, is applied to a sync separator and timing signal generator 160. Generator 160 includes synchronizing signal separator and sensing circuits and counter circuits for producing a horizontal blanking interval signal which is applied to a clock (CLK) input of a line counter 165, and for producing a vertical blanking interval signal which is applied to a RESET input of line counter 165. Counter 165 is reset at the end of each vertical blanking input signal and then initiates a horizontal line counting process in response to the clock input horizontal blanking signal. The OUTPUT signal is obtained by sensing the least significant bit of the line count to produce a low logic level for even lines and a high logic level for odd lines, for example. Apparatus suitable for use as the field identifier networks shown in FIG. 6 for producing field identifier signals $F_F$ and $F'_F$ can be readily developed as explained, for example, in the text "Circuit Concepts" by Gerald A. Eastman, pp. 88–92, available from Tektronix, Inc., Beaverton, Ore.

The principles of the present invention can be used to encode, for combining and subsequent separation, signals other than luminance and chrominance components as disclosed. In such case one of the signals to be combined should exhibit a line-to-line phase change (i.e., having substantial negative correlation) within a field or within a frame so as to develop an invertible algorithm such as the illustrated algorithm employing additive and subtractive signal combination. The required phase change may be inherent in the nature of such signal, or it may be produced by external means such as a modulation process.

The principles of the present invention also can be used to develop a cooperative frame processor encoder/decoder arrangement where elements to be grouped are 525H apart, i.e., a frame apart, rather than 1H or 263H apart as illustrated.

What is claimed is:

1. A system for encoding video signal luminance and chrominance information, comprising:

means for providing processed luminance information, exclusive of chrominance information, with groups of mutually exclusive correlated image information pixels of identical value within each group, said pixels within each group being separated by an odd number of image scanning lines within an image frame;

means for providing processed chrominance information, exclusive of luminance information, with groups of mutually exclusive correlated image information pixels of identical value within each group, said pixels within each group being separated by an odd number of image scanning lines within an image frame, said chrominance information exhibiting opposite phase from one image scanning line to the next; and means for combining said processed luminance and chrominance information with an invertible algorithm to produce a combined encoded video signal.

2. A system according to claim 1, wherein:
said groups of luminance information pixels and said groups of chrominance information pixels respectively contain information obtained from pixels separated by one image scanning line (1H).

3. A system according to claim 2, wherein:
said means for providing processed chrominance information and said means for providing processed luminance information each include means for replacing original pixel values with pixel values obtained by averaging pixels 1H apart in a scanning field.

4. A system according to claim 1, wherein:
said groups of luminance information pixels and said groups of chrominance information pixels respectively contain information obtained from pixels separated by 263H within a frame.

5. A system according to claim 4, wherein:
said identical value for said pixels within each respective group is obtained by replacing original pixel values with pixel values obtained by averaging pixels 263H apart within an image frame.

6. A system according to claim 1, wherein:
said processed luminance information includes high frequency luminance information exclusive of low frequency information.

7. A system according to claim 6, wherein:
said processed high frequency luminance information is substantially exclusive of vertical detail information.

8. A system according to claim 1, and further including:
means for modulating a chrominance subcarrier with chrominance information to produce said opposite phase.

9. A system according to claim 8, wherein:
said combined encoded video signal includes (a) said processed chrominance information including said modulated chrominance subcarrier, (b) said processed luminance information containing high frequency information exclusive of low frequency luminance information, and (c) said low frequency luminance information.

10. A system for receiving the combined encoded signal of claim 1, comprising:
means employing the inverse of said invertible algorithm for separating said combined encoded video signal into its constituent processed luminance and processed chrominance components; and means for conveying said separated processed luminance and chrominance components to an image signal processing channel.

11. A system according to claim 10, further comprising:
frequency selective means for separating said received combined encoded signal into low and high frequency components; and means for conveying said separated high frequency component to said separating means for obtaining said constituent processed luminance and processed chrominance components from said separated high frequency component.

12. A decoder system for receiving a video signal having a luminance component with groups of mutually exclusive correlated image information pixels of identical value within each group separated by an odd number of image scanning lines within an image frame, combined with a chrominance component with groups of mutually exclusive correlated image information pixels of identical value within each group separated by an odd number of image scanning lines within an image frame, said chrominance component exhibiting opposite phase from one image scanning line to the next; said system comprising:
means for separating said combined luminance and chrominance components; and means for conveying said separated luminance and chrominance components to an image signal processing channel.

13. A system according to claim 12, wherein:
said separating means includes means for summing and differencing pixel groups a scanning line apart.

14. A system according to claim 12, wherein:
said separating means includes means for summing and differencing pixel groups 263 H apart, where H is a scanning line interval.

15. A system according to claim 12 and further comprising:
frequency selective means for separating said received video signal having said luminance and chrominance components into low and high frequency components; and means for conveying said high frequency component from said frequency selective means to said separating said high frequency component into luminance and chrominance components.

16. A system according to claim 15 and further comprising:
means for combining said separated luminance component from said separating means with said low frequency component from said frequency selective means to produce a combined signal;

luminance signal processing means for receiving said combined signal; and chrominance signal processing means for receiving said chrominance component from said separating means.

17. A system according to claim 16, wherein: said chrominance signal processing means includes chrominance demodulating means.

18. A system for encoding first and second components of a video signal, comprising:
means for providing a processed first component, exclusive of said second component, with groups of mutually exclusive correlated image information pixels of identical value within each group separated by an odd number of image scanning lines within an image frame;

means for providing a processed second component, exclusive of said first component, with groups of mutually exclusive correlated image information pixels of identical value within each group separated by an odd number of image scanning lines within an image frame, said second component exhibiting opposite phase from one image scanning line to the next; and means for combining said processed first and second components with an invertible algorithm to produce a combined encoded video signal.

19. A system according to claim 18, wherein:

said first component groups of image information pixels and said second component groups of image information pixels respectively contain information obtained from pixels separated by one image scanning line (1H).

20. A system according to claim 19, wherein:

said means for providing processed chrominance information and said means for providing processed luminance information each include means for replacing original pixel values with pixel values obtained by averaging pixels 1H apart in a scanning field.

21. A system according to claim 18, wherein:

said first component groups and said second component groups respectively contain information obtained from pixels separated by 263H within a frame.

22. A system according to claim 21, wherein:

said means for providing processed chrominance information and said means for providing processed luminance information each include means for replacing original pixel values with pixel values obtained by averaging pixels 263H apart within an image frame.

23. A system according to claim 18, wherein:

said processed first component includes high frequency information exclusive of low frequency information. information. 2/

24. A system according to claim 18, and further including:

means for modulating a carrier signal with said second component to produce said opposite phase.

25. A system according to claim 24, wherein: said combined encoded video signal includes (a) said processed second component including said modulated carrier, (b) said processed first component containing high frequency information exclusive of low frequency information, and (c) said low frequency information.

26. A system for receiving the combined encoded signal of claim 18, comprising:

means employing the inverse of said invertible algorithm for separating said combined encoded video signal into its constituent processed first and processed second components; and means for conveying said separated processed components to an image signal processing channel.

27. A system for receiving a video signal having a first component with groups of mutually exclusive correlated image information pixels of identical value within each group separated by an odd number of image scanning lines within an image frame, combined with a second component with groups of mutually exclusive correlated image information pixels of identical value within each group separated by an odd number of image scanning lines within an image frame, said second component exhibiting opposite phase from one scanning line to the next; said system comprising:

means for separating said combined first and second components; and means for conveying said separated first and second components to an image signal processing channel.

28. A system according to claim 27, wherein: said separating means includes means for summing and differencing pixel groups a scanning line apart.

29. A system according to claim 27, wherein: said separating means includes means for summing and differencing pixel groups 263H apart, where H is a scanning line interval.

30. A system according to claim 27, and further comprising:

frequency selective means for separating said received video signal having said combined first and second components into low and high frequency components; and means for conveying said combined high frequency component to said separating means for providing a separated high frequency first component and a separated second component.

* * * * *